United States Patent [19]
White et al.

[11] Patent Number: 5,089,938
[45] Date of Patent: Feb. 18, 1992

[54] COMPONENT MOUNTING ASSEMBLY

[75] Inventors: James S. White, Linden; William W. Adams, Flint, both of Mich.

[73] Assignee: General Motors Corporation, Detroit, Mich.

[21] Appl. No.: 690,212

[22] Filed: Apr. 24, 1991

[51] Int. Cl.⁵ .............................................. H02B 1/01
[52] U.S. Cl. ................................. 361/427; 55/385.3; 248/301; 361/380
[58] Field of Search ....................... 55/385.3; 248/301; 361/380, 417, 419, 420, 427

[56] References Cited

U.S. PATENT DOCUMENTS

| | | | |
|---|---|---|---|
| 502,151 | 3/1976 | Schonberger et al. | 55/417 |
| 2,730,084 | 1/1956 | Stegeman | 123/11.65 |
| 3,460,322 | 8/1969 | Rivers et al. | 55/484 |
| 3,839,850 | 10/1974 | Jamiol | 55/341 |
| 4,440,555 | 4/1984 | Chichester | 55/385 |
| 4,628,689 | 12/1986 | Jourdan | 29/416 |
| 4,778,029 | 10/1988 | Thronburgh | 181/229 |
| 4,847,733 | 7/1989 | Roy et al. | 361/427 |
| 4,929,263 | 5/1990 | Kasugai | 55/502 |
| 4,991,061 | 2/1991 | Strange | 361/427 |

Primary Examiner—Gregory D. Thompson
Attorney, Agent, or Firm—Gordon F. Belcher

[57] ABSTRACT

A component mounting assembly comprises a mounting bracket including a bracket member adapted to be fixed to a foundation member, and a bracket flange and a first bracket shoulder connected to the bracket member. The first bracket shoulder has a first shoulder flange which has a first shoulder slot with a first slot opening formed in its end nearest the bracket flange. The component mounting assembly further comprises a component support including a support member adapted to support a component, and a support flange and a first support post connected to the support member. The first support post is located with respect to the support flange so that when the support flange engages the bracket flange, the first support post can be inserted into the first shoulder slot. A fastener enables attachment of the support flange to the bracket flange when they are in engagement enabling the component support to be fixed to the mounting bracket.

8 Claims, 2 Drawing Sheets

COMPONENT MOUNTING ASSEMBLY

TECHNICAL FIELD

This invention relates to a component mounting assembly for mounting a component to a foundation member and, more particularly, to a component mounting assembly including a component support which can be releasably attached to a mounting bracket which is fixed to a foundation member.

BACKGROUND

Components can be releasably mounted to a foundation member by supporting the component on a component support and releasably attaching the component support to a mounting bracket which is fixed to the foundation member. One such use for such mounting assemblies is to mount components in an engine compartment of a vehicle. In a typical engine compartment, the mounting bracket can be attached to the inner surface of the engine compartment or to a part fixed in the engine compartment. The component support, which supports the component, can then be releasably mounted to the mounting bracket. One advantage of such releasable mounting in an engine compartment is that it permits removal of the component for servicing or replacement.

Engine compartments can be quite crowded. This can be due to the vehicle itself being rather small and to the engine compartment containing many accessories in addition to the engine. Releasably mounting a component to a mounting bracket which is fixed in a crowded engine compartment can be difficult for a number of reasons. First, the component can have a number of releasable fasteners distributed around its outer surface which must be releasably attached to the mounting bracket. If the engine compartment is crowded, then accessibility to at least some of the fasteners can be limited making connection of the fasteners to the mounting bracket difficult. Secondly, it can be necessary to manipulate the component adjacent to the mounting bracket in order to attach it to the mounting bracket. If the engine compartment is crowded, it may be difficult to perform the manipulations required to attach the component to the mounting bracket.

Thirdly, it is important that each attachment point on the component correctly mate with the corresponding attachment point on the mounting bracket. This is especially important in a crowded engine compartment since there is little room therein to make adjustments to the locations of the attachment points on the mounting bracket and component in the event that they are not properly aligned with respect to one another. This can make manufacture of the mounting bracket and component difficult since low tolerances in the locations of the attachment points on the mounting bracket and component can be small. Additionally, even if the attachment points on the component and on the mounting bracket are correctly located during manufacture, it can be difficult to maintain their correct locations in a crowded engine compartment since during such installation in and removal from the engine compartment, as well as during vehicle operation, the component and mounting bracket can inadvertently strike other components or each other.

SUMMARY OF THE INVENTION

The present invention provides a component mounting assembly comprising a mounting bracket including a bracket member adapted to be fixed to a foundation member, and a bracket flange and a first bracket shoulder connected to the bracket member. The first bracket shoulder has a first shoulder flange which has a first shoulder slot with a first slot opening formed in its end nearest the bracket flange. The component mounting assembly further comprises a component support including a support member adapted to support a component, and a support flange and a first support post connected to the support member. The first support post is located with respect to the support flange so that when the support flange engages the bracket flange, the first support post can be inserted into the first shoulder slot. A fastener enables attachment of the support flange to the bracket flange when they are in engagement enabling the component support to be fixed to the mounting bracket.

The engagement between the first support post and the first bracket shoulder permits some variation in the alignment of the first support post with respect to the length of the first shoulder slot thereby enabling increased tolerances in the location of the first support shoulder on the support member and in the location of the first support post on the support member. This can facilitate manufacture of the component support and mounting bracket, and allows some alteration of the alignment between the first support post and first shoulder slot which can occur from their inadvertently contacting one another, or other components in the engine compartment. Also, accessibility to the first support post and first bracket shoulder is not required in order to engage them with one another. This reduces the area of the mounting bracket and component support which must be accessible in order to attach the component support to the mounting bracket. The engagement between the support and bracket flanges, and between the first support post and the first bracket shoulder also reduces the space adjacent to the support bracket being required to manipulate the component support during its attachment to the support bracket.

These and other features and advantages of the invention will be more fully understood from the following description of certain specific embodiments of the invention taken together with the accompanying drawings.

BRIEF DRAWING DESCRIPTION

Corresponding reference characters indicate corresponding parts throughout the several views of the drawings.

DETAILED DESCRIPTION

Figure 1:
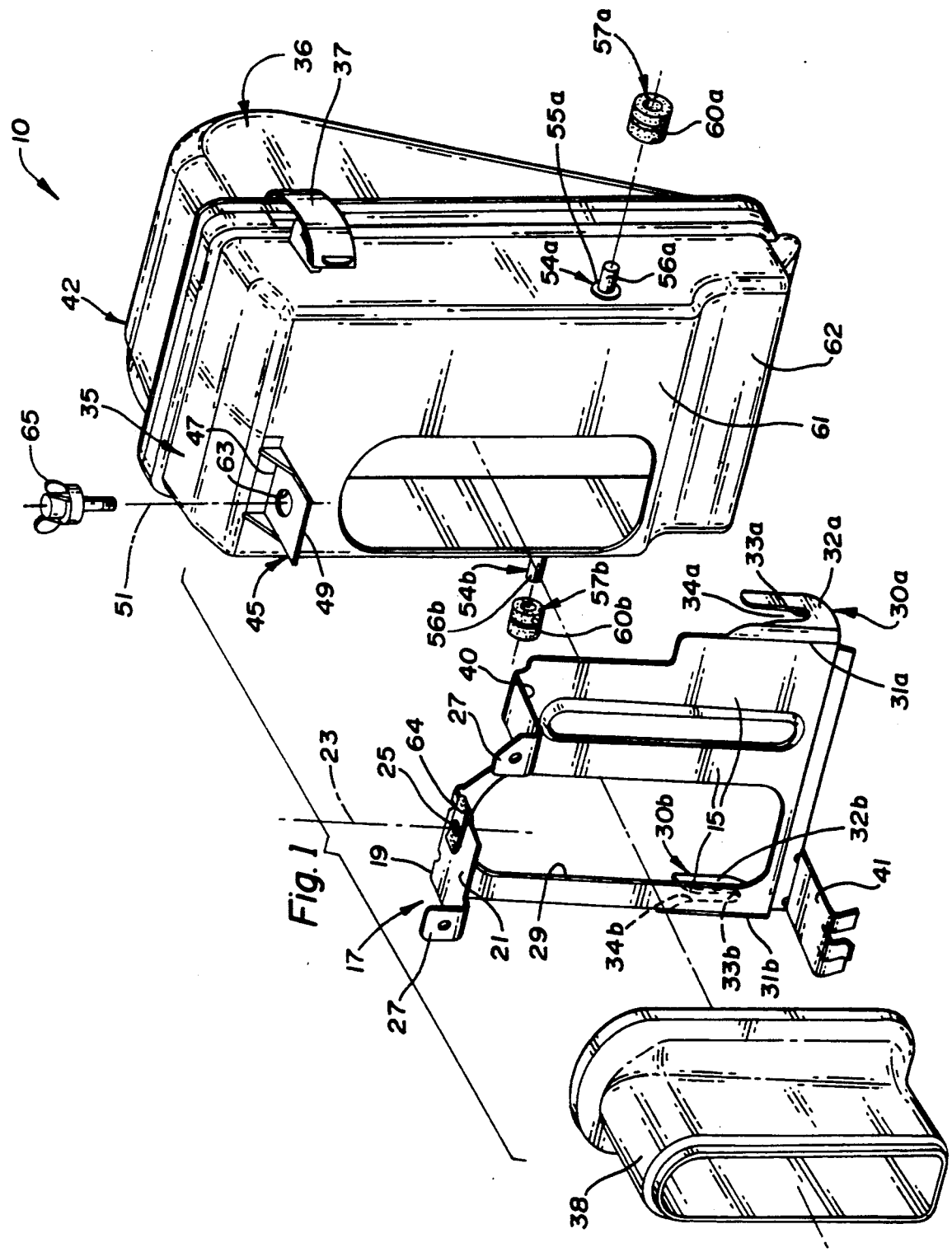
FIG. 1 is an exploded view showing a component mounting assembly of the present invention.

Referring now to the drawings in detail, numeral 10 generally indicates a component mounting assembly of the present invention used to mount a component support to a foundation member 14. The component mounting assembly 10 is particularly suited for mounting an air filter element 12 for an engine in an engine compartment of a vehicle wherein the foundation member 14 comprises any member in the engine compartment which is fixed with respect thereto, as well as the inner surface of the engine compartment. The component assembly 10 will therefore be described in connection therewith. The component mounting assembly 10 may also be used to mount other components to foundation members.

The component mounting assembly 10 comprises a mounting bracket, having a bracket member 15 and a bracket flange generally designated by the numeral 17 connected to the bracket member 15. The bracket flange 17 includes a bracket base 19 which adjoins the bracket member 15 and a bracket fastener surface 21 defined by the flat upper surface of the bracket flange. The bracket flange 17 includes an aperture 25 which extends through the bracket fastener surface 21. The bracket flange 17 has a bracket fastener axis 23 which is perpendicular to the bracket fastener surface 21 and coincides with the center of the aperture 25.

The mounting bracket includes first and second bracket shoulders generally designated by the numerals 30a, b, respectively. The first bracket shoulder 30a comprises a first shoulder base 31a connected to the bracket member 15 and a first shoulder flange 32a extending away from the first shoulder base 31a. The bracket base 19 and first shoulder base 31a lie in a bracket plane 29 which is perpendicular to the bracket fastener surface 21 and parallel to the bracket fastener axis 23. The first bracket shoulder 30a extends away from the bracket plane 29 in the opposite direction with respect to the bracket flange 17. The structure and orientation of the second bracket shoulder 30b is the same as the first bracket shoulder 30a, with the second shoulder base 31b also lying in the bracket plane 29. The end of the second shoulder slot 33b nearest to the bracket flange 17 has a slot opening 34b.

The first bracket shoulder 30a has a first shoulder slot 33a. The plane of the first shoulder slot 33a is perpendicular with respect to the bracket plane 29. The axis of the first shoulder slot 33a is parallel to the bracket plane 29. The end of the first shoulder slot 33a nearest to the bracket flange 17 has a slot opening 34a. The first shoulder flange 32a is spaced apart from the bracket flange 17 in a parallel direction with respect to the bracket fastener axis 23 and so that the bracket fastener surface 21 faces away from the first bracket shoulder 30a. The second bracket shoulder 30b has a second shoulder slot 33b with the same structure and orientation as the first shoulder slot 33a. The second bracket shoulder 30b comprises a second shoulder base 31b connected to bracket member 15 and a second shoulder flange 32b extending away from the second shoulder base 31b. The first and second bracket shoulders 30a, b are spaced apart from one another so that the bracket fastener axis 23 is disposed between the planes of the first and second shoulder slots 33a, b.

The mounting bracket includes upper and lower clips 40, 41 connected to the bracket member 15. The bracket member 15 also has an attachment flange 27 connected to the bracket flange 17 and an attachment flange 27 connected to the upper clip 40. The attachment flanges 27 have apertures through which fasteners extend to fix the bracket member 15 to the foundation member 14.

The component mounting assembly includes a component support including a support member designated generally by the numeral 42. The support member 42 comprises a component inlet member 35 and a component outlet member 36. The component inlet and outlet members 35, 36 house an air filter element 12 and are held together by overcenter clamps 37. The overcenter clamps 37 facilitate attachment of the component inlet member 35 to the component outlet member 36 and enable ready disconnection of the members, if necessary. The component inlet member 35 has an opening which registers with an inlet attachment 38 and the component outlet member 36 has an opening which registers with a hose which leads to an engine. The inlet attachment 38 is held between the upper and lower clips 40, 41, and can be connected to an inlet conduit. The air filter element 12 is thereby able to filter air which is supplied to an engine.

The component assembly further comprises a support flange generally designated by the numeral 45 connected to the support member 42. The support flange 45 includes a support base 47 adjoining the support member 42 and a support fastener surface 49 defined by the flat lower surface of the support flange. The support flange 45 includes an aperture 63 which extends through the support fastener surface 49. The support flange 45 has a support fastener axis 51 which is perpendicular to the support fastener surface 49 and coincides with the center of the aperture 63.

The component support further includes first and second coaxial support posts generally designated by the numerals 54a, b respectively. The first support post 54a has a first post base 55a connected to the support member 42 and a first post member 56a extending from the first post base 55a. The first support post 54a has a first engagement portion comprising a resilient first grommet 57a inserted thereon. The first grommet 57a has an outer diameter which is larger than the width of the first shoulder slot 33a, and annular first groove 60a having an inner diameter which is smaller than the width of the first shoulder slot 33a.

The first support post 54a is connected to the support member 42 so that the first post base 55a and support base 47 lie in a support plane 61 which is perpendicular with respect to the support fastener surface 49 and parallel to the support fastener axis 51. The first support post 54a extends away from the support member 42 in a parallel direction with respect to the support plane 61 and the support fastener surface 49. The first support post 54a is spaced apart from the support flange 45 in a parallel direction with respect to the support fastener axis 51 and so that the support fastener surface 49 faces toward the first support post. The structure and orientation of the second support post 54b is the same as the first support post 54a with the first and second support posts extending away from one another. The second support post 54b also lies in the support plane 61. The first and second support posts 54a, b are spaced apart from one another so that the support fastener axis 51 is disposed between the first and second post bases 55a, b.

The first and second support posts 54a, b are located with respect to one another and with respect to the support flange 45 so that when the support fastener surface 49 engages the bracket fastener surface 21 with the apertures 25, 63 in coaxial alignment with one another, the first and second grooves 60a, b can be inserted into the first and second shoulder slots 33a, b with the support plane 61 having a parallel orientation with respect to the bracket plane 29. The increased outer diameter of the first and second grommets 57a, b on either side of the first and second grooves 60a, b results in the first and second grommets 57a, b obstructing relative displacement between the support member 42 and bracket member 15 in a direction parallel to the axis of the first and second support posts 54a, b when the first and second grooves 60a, b are inserted into the first and second shoulder slots 33a, b.

The component mounting assembly 10 further comprises a fastener means constituted by a U-clip 64 which sandwiches the bracket fastener surface 21 adjacent to the aperture 25. The U-clip 64 has threaded openings which coaxially align with the aperture 25. A threaded bolt 65 extends through the apertures 63, 25 and is screwed into the threaded openings of the U-clip 64 to attach the support flange 45 to the bracket flange 17. The bolt 65 preferably includes a wing nut to enable tightening of it by hand. A resilient pad can be disposed between the bracket and support flanges 17, 45. The insertion of the first and second grooves 60a, b into the first and second shoulder slots 33a, b, and the attachment of the support flange 45 to the bracket flange 17 enables the component support to be fixed to the support bracket.

The engagement between the first and second grommets 57a, b and the first and second bracket shoulders 30a, b permits some variation in the alignment of the first and second support posts 54a, b with respect to the length of the first and second shoulder slots 33a, b since the first and second grommets 57a, b need not extend down to the lower ends of the first and second shoulder slots 33a, b. This enables increased tolerances in the location of the first and second bracket shoulders 30a, b on the bracket member 15 and in the location of the first and second support posts 54a, b on the support member 42. Also, the engagement between the first and second grommets 57a, b and the first and second bracket shoulders 30a, b does not require accessibility to the support posts 54a, b and bracket shoulders 30a, b.

The component mounting assembly 10 also enables the air filter element 12 to be held in a vertical orientation. This reduces the number of bends required in the airflow path which facilitates the flow of air to the engine. The first and second grommets 57a, b reduce the transmission of vibrations form the first and second bracket shoulders 30a, b to the first and second support posts 54a, b. Placement of a resilient pad between the bracket and support flanges 17, 45 can further reduce vibrations between these flanges.

The portion of the support member 42 between the first post base 55a and the end of the support member opposite the support flange 45 (i.e., the lower end 62 of the support member) does not extend beyond a first post plane which is perpendicular to the support plane 61 and which contains the first post base. The portion of the support member 42 between the second post base 55b and the lower end 62 of the support member does not extend beyond a second post plane perpendicular to the support plane 61 and which contains the second post base. At least a part of the lower portion of the support member 42 is contained between the first and second post planes. This allows downward insertion of the lower end 62 of the support member 42 between the first and second bracket shoulders 30a, b enabling the first and second grooves 60a, b to enter the first and second shoulder slots 33a, b. This reduces the amount of space adjacent to the support bracket which is required to manipulate the component support during its attachment thereto.

The maximum dimension of the support member 42 in the direction parallel to the length of the first and second support posts 54a, b (i.e., the width of the support member 42) is less than distance between the planes of the first and second shoulder slots 33a, b in a perpendicular direction with respect to them. This facilitates viewing of the connection between the first and second grommets 57a, b and the first and second bracket shoulders 30a, b. This facilitates visual inspection to confirm that the first and second grooves 60a, b are properly seated in the first and second shoulder slots 33a, b.

Figure 2:
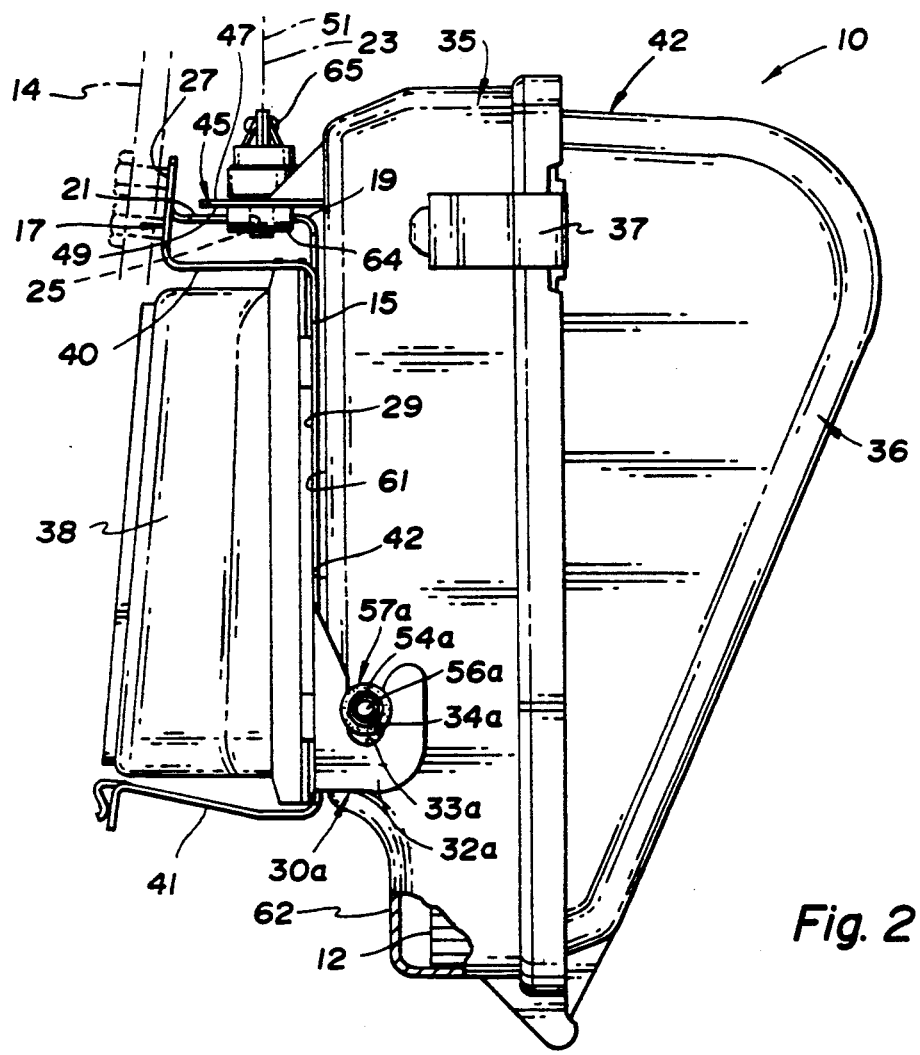
FIG. 2 is a side view of the component mounting assembly of FIG. 1 wherein the various parts are assembled.
Figure 3:
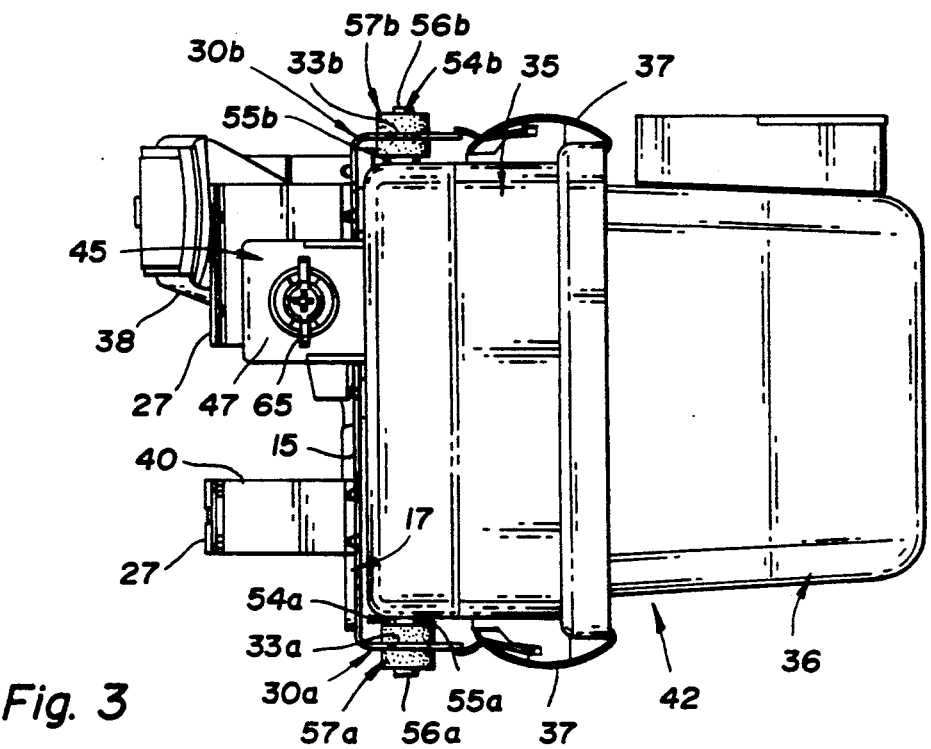
FIG. 3 is a plan view of the component mounting assembly of FIG. 2.

While the component mounting assembly 10 shown in FIGS. 1-3 has first and second bracket shoulders 30a, b, and first and second support posts 54a, b, the component mounting assembly may lack the second bracket shoulder and second support post and still provide a means for releasably attaching a component support to a mounting bracket.

While the invention has been described by reference to certain preferred embodiments it should be understood that numerous changes could be made within the spirit and scope of the inventive concepts described. Accordingly, it is intended that the invention not be limited to the disclosed embodiments, but it have the full scope permitted by the language of the following claims.

The embodiments of the invention in which an exclusive property or privilege is claimed are defined as follows:

1. A component mounting assembly comprising:
   a mounting bracket including a bracket member adapted to be fixed to a foundation member, a bracket flange comprising a bracket base and a bracket fastener surface, said bracket base being connected to said bracket member, said bracket fastener surface having a bracket fastener axis perpendicular thereto, said mounting bracket further including a first bracket shoulder having a first shoulder base and a first shoulder flange, said first shoulder base being connected to said bracket member so that said bracket base and first shoulder base lie in a bracket plane which is perpendicular to said bracket fastener surface and parallel to said bracket fastener axis, said first bracket shoulder extending away from said bracket plane in the opposite direction with respect to said bracket flange, said first shoulder flange having a first shoulder slot in a plane which is perpendicular to said bracket plane and an axis which is parallel to said bracket plane, said first shoulder slot further having an end nearest said bracket flange which has a slot opening, said first shoulder flange being spaced apart from said bracket flange in a parallel direction with respect to said bracket fastener axis so that said bracket fastener surface faces away from said first bracket shoulder;
   a component support including a support member adapted to support a component, a support flange comprising a support base and a support fastener surface, said support base being connected to said support member, said support fastener surface having a support fastener axis perpendicular thereto, said component support further including a first support post having a first post base, a first post member and a first engagement portion having an outer diameter which is larger than the width of said first shoulder slot, said first engagement portion including an annular first groove having an inner diameter which is smaller than the width of said first shoulder slot, said first post base being connected to said support member so that said first post based and support base lie in a support plane which is perpendicular with respect to said support fastener surface and parallel to said support fastener axis, said first support post extending away from said support member in a parallel direction with respect to said support plane and said support fastener surface, said first support post being spaced apart from said support flange in a parallel direction with respect to said support fastener axis so that said support fastener surface faces toward said first support post, said first support post being located with respect to said support flange so that when said support fastener surface engages said bracket fastener surface, said first groove can be inserted into said first shoulder slot with said support plane being parallel to said bracket plane; and a fastener means for attaching said support fastener surface to said bracket fastener surface when they are in engagement enabling said component support to be fixed to said mounting bracket.

2. A component assembly as set forth in claim 1 wherein said mounting bracket further includes a second bracket shoulder having a second shoulder base and a second shoulder flange, said second shoulder base being connected to said bracket member so that said second shoulder base lies in said bracket plane, said second bracket shoulder extending away from said bracket plane in the opposite direction with respect to said bracket flange, said second shoulder flange having a second shoulder slot in a plane which is perpendicular to said bracket plane and an axis which is parallel to said bracket plane, said second shoulder slot further having an end nearest said bracket flange which has a slot opening, said second shoulder flange being spaced apart from said bracket flange in a parallel direction with respect to said bracket fastener axis so that said bracket fastener surface faces away from said second bracket shoulder, said bracket shoulders being spaced apart from one another so that said bracket fastener axis is disposed between said planes of said first and second shoulder slots; and said component support further including a second support post having a second post base, a second post member and a second engagement portion having an outer diameter which is larger than the width of said second shoulder slot, said second engagement portion including an annular second groove having an inner diameter which is smaller than the width of said second shoulder slot, said second post base being connected to said support member so that said second post base and support base lie in said support plane, said second support post extending away from said support member in a parallel direction with respect to said support plane and said support fastener surface, said second support post being spaced apart from said support flange in a parallel direction with respect to said support fastener axis so that said support fastener surface faces toward said second support post, said second support post being located with respect to said support flange so that when said support fastener surface engages said bracket fastener surface and said first groove is inserted into said first shoulder slot, said second groove can be inserted into said second shoulder slot.

3. A component assembly as set forth in claim 2 wherein said first and second support posts are coaxial.

4. A component assembly as set forth in claim 1 wherein said first engagement portion of said first support post comprises a resilient first grommet insertable thereon, said first grommet having said first groove formed therein.

5. A component assembly as set forth in claim 2 wherein the portion of said support member between said first support post and the end of said support member opposite said support flange does not extend beyond a first post plane perpendicular to said support plane which contains said first post base, and the portion of said support member between said second support post and the end of said support member does not extend beyond a second post plane perpendicular to said support plane which contains said second post base.

6. A component assembly as set forth in claim 2 wherein the maximum dimension of said support member in the direction parallel to the length of said first and second support posts is less than distance between said planes of said first and second shoulder slots in a perpendicular direction with respect to the planes of said first and second shoulder slots.

7. A component assembly as set forth in claim 1 wherein said fastener means comprises a threaded bolt adapted to extend through apertures in said support and bracket fastener surfaces.

8. A component assembly as set forth in claim 1 wherein said support member comprises a pair of detachable members adapted to house a removable filter element.

* * * * *